Patented Dec. 17, 1929

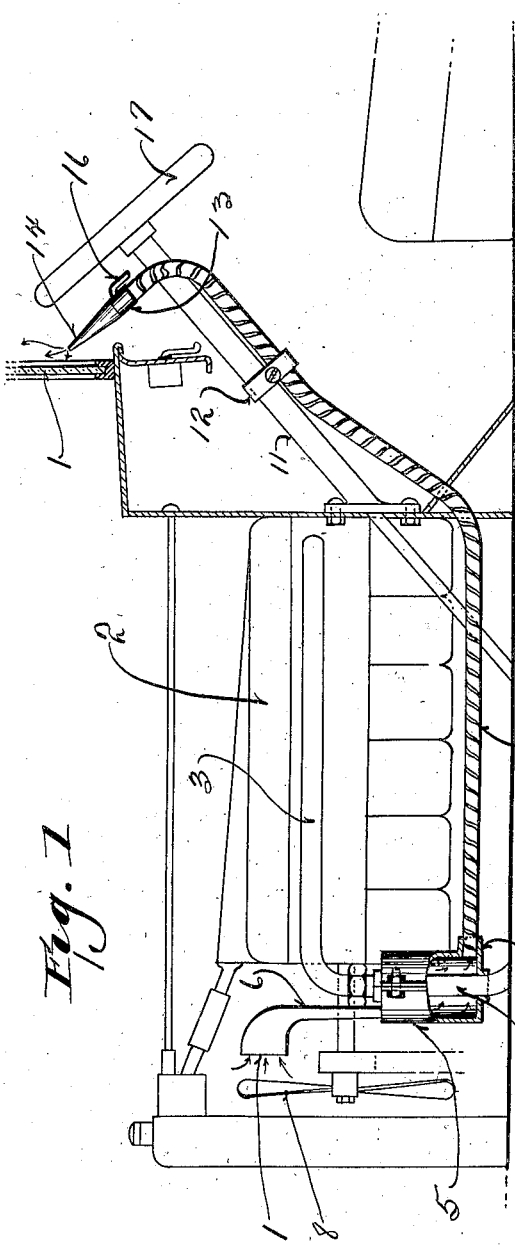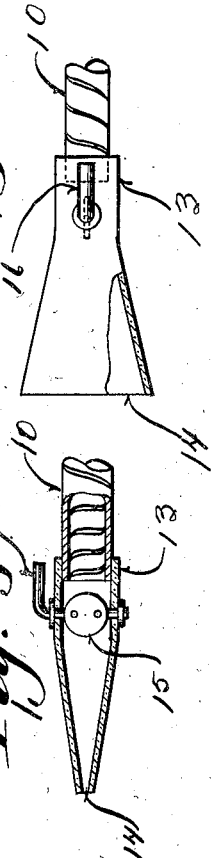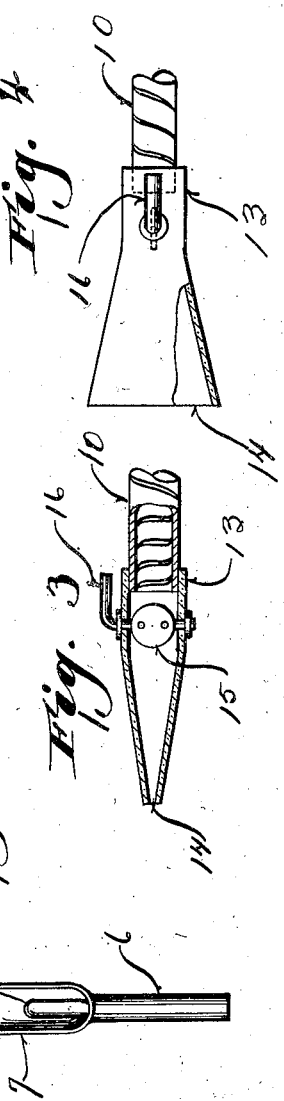

1,740,193

UNITED STATES PATENT OFFICE

HARVEY H. MONTGOMERY, OF SAUK CITY, WISCONSIN

ANTIFROST DEVICE FOR WINDSHIELDS

Application filed February 9, 1927. Serial No. 166,919.

This invention relates to an anti-frost device for windshields.

Objects of this invention are to provide a device for preventing the formation of frost upon the windshields and which is so constructed that a heated stream of air is conducted through an adjustable member and its amount controlled and directed against the particular portion of the windshield which it is desired to keep clean, so that the driver may have a free and unobstructed vision through the windshield.

Further objects are to provide a device which may be associated with the usual types of internal combustion engines used in automobiles without necessitating an additional drain upon the battery, as in the electrical types of heaters, and without bringing any portion of the exhaust pipe adjacent the windshield, but which is so constructed that the heat from the exhaust pipe is employed to heat a fresh air stream beneath the hood of the engine and this fresh air stream is brought into the car and directed against the windshield by an adjustable and controlled member, so that not only may the volume be controlled, but also its direction and point of application.

An embodiment of the invention is shown in the accompanying drawings in which:—

Figure 1 is a view showing the device in place, such view being diagrammatic and partly in section;

Figure 2 is a face view of the air intake;

Figure 3 is a sectional view through the nozzle and the adjacent portion of the flexible tubing;

Figure 4 is a further view of the nozzle and associated portion of the tubing.

Referring to the drawings, it will be seen that an automobile has been illustrated as provided with the windshield 1 and with the internal combustion engine 2 equipped with an exhaust pipe 3. The exhaust pipe is led forwardly and connected to a downwardly extending portion 4. This downwardly extending portion is clamped between the two half sections of a heater drum or air heating chamber 5, as indicated in Figure 1, so that the exhaust pipe passes centrally through such chamber and heats the air passing around the exhaust pipe and through the chamber. The forward half section carries an upstanding funnel-like member 6 which constitutes an air intake, and it will be noted from Figures 1 and 2, that this member is provided with an enlarged mouth 7, which, in the form shown, is roughly oval and arranged in a vertical position. The intake member is positioned directly behind the fan 8 of the engine, as shown in Figure 1.

The rear half of the air heating drum 5 is provided with an outlet portion 9 which receives the forward end of a flexible hot air tubing 10. This tubing extends rearwardly into the body of the automobile and is secured to the steering column 11 by means of an adjustable clamp 12. The end of the tubing is received in the constricted end of a nozzle 13, such nozzle being provided with a flattened and flared discharge end 14 which merges into the constricted end 13, as shown particularly in Figures 3 and 4. In the constricted end of the nozzle a damper 15 is positioned and is controlled by means of a hand lever 16 on the outer side of the nozzle adjacent the steering wheel 17, so that the hand lever is in easy access of the driver.

It is to be noted that the nozzle directs a flat stream of heated air upwardly in a slanting manner against the windshield, so that it keeps the windshield free of frost for a material portion of its extent and thus provides an unobstructed clear field of vision for the driver. The amount of air is obviously easily controlled by the freely accessible hand lever 16 which operates the damper, and also it is to be noted that the clamp 12 may be slid along the steering column 11 and clamped in place to vary the adjustment of the nozzle. Further, this flexible tubing as is well known, tends to retain its position after adjustment and, consequently, the nozzle may be adjusted at the exact angle desired, and will be retained in adjusted position by the flexible tubing.

It will be seen that no additional load is placed upon the electrical equipment of the automobile, as the entire heat needed for the apparatus is extracted from the exhaust. Further, it will be seen that no exhaust pipe 10 enters the cab or body of the automobile and, consequently, objectionable smells and excess heating is wholly avoided.

Further, it will be seen that the danger from fire is eliminated by this construction, as the exhaust is not brought outside of the hood in order to adapt it for use with this type of apparatus. In addition to this, the air is taken into the inlet portion of the apparatus at a point in advance of the engine and, consequently, no smells of oils or gasoline will be carried into the car by this apparatus.

It will be seen further that the apparatus is easy to install, is effective in operation, and is of simple construction.

Although the invention has been described in considerable detail, such description is intended as illustrative rather than limiting as the invention may be variously embodied and as the scope of such invention is to be determined as claimed.

I claim:

In a device of the class described, a two-part drum having aligned openings in the ends thereof and an outlet through the side adjacent one end, a heater pipe extending through the aligned openings, an air inlet at one end of the drum, a nozzle, a substantially flat flared end on said nozzle, a damper in the nozzle, a handle connected with the damper and a flexible tubing having one end connected with the outlet of the drum and its other end connected to the nozzle.

In testimony that I claim the foregoing I have hereunto set my hand at Sauk City, in the county of Sauk and State of Wisconsin.

HARVEY H. MONTGOMERY.